UNITED STATES PATENT OFFICE.

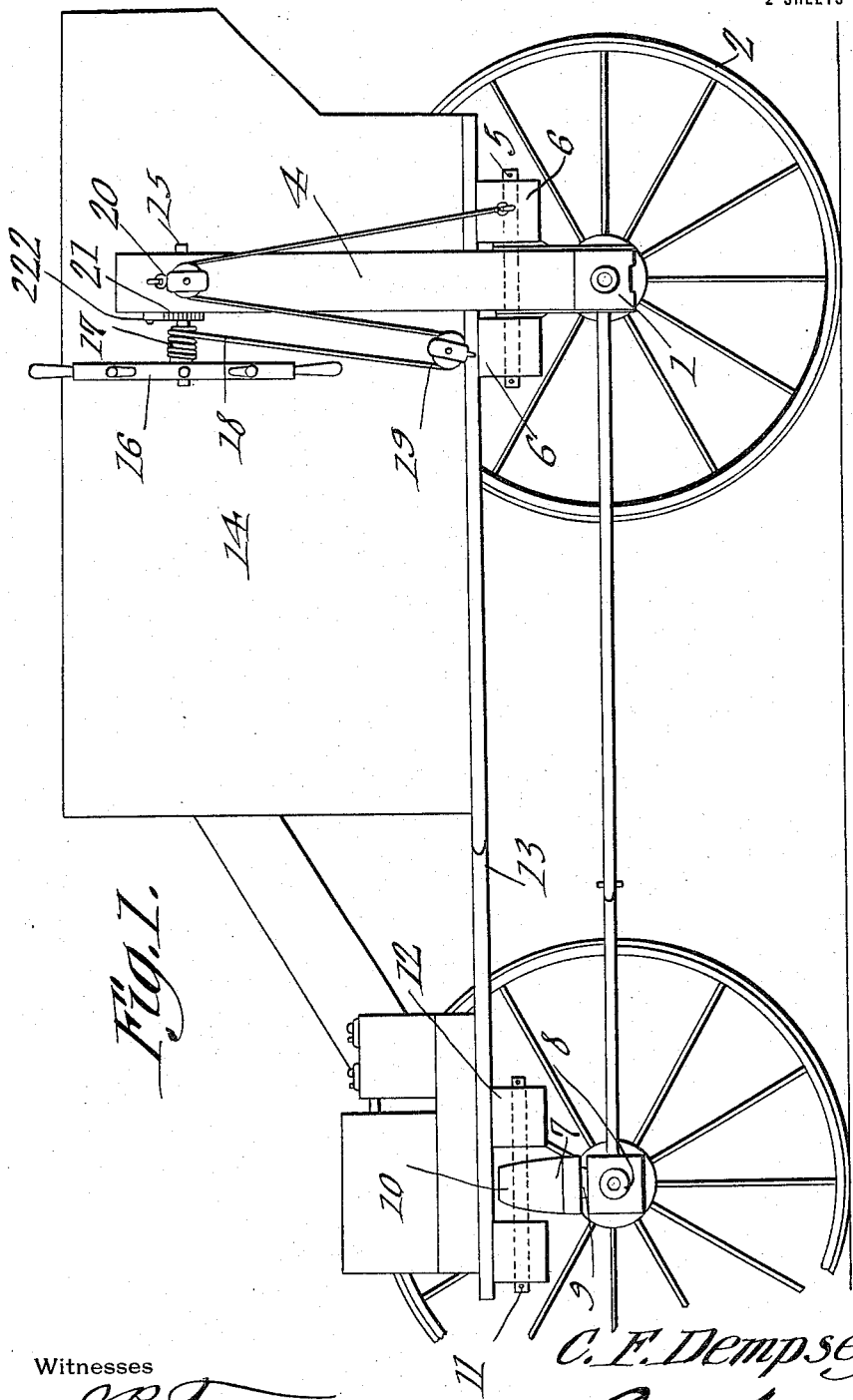

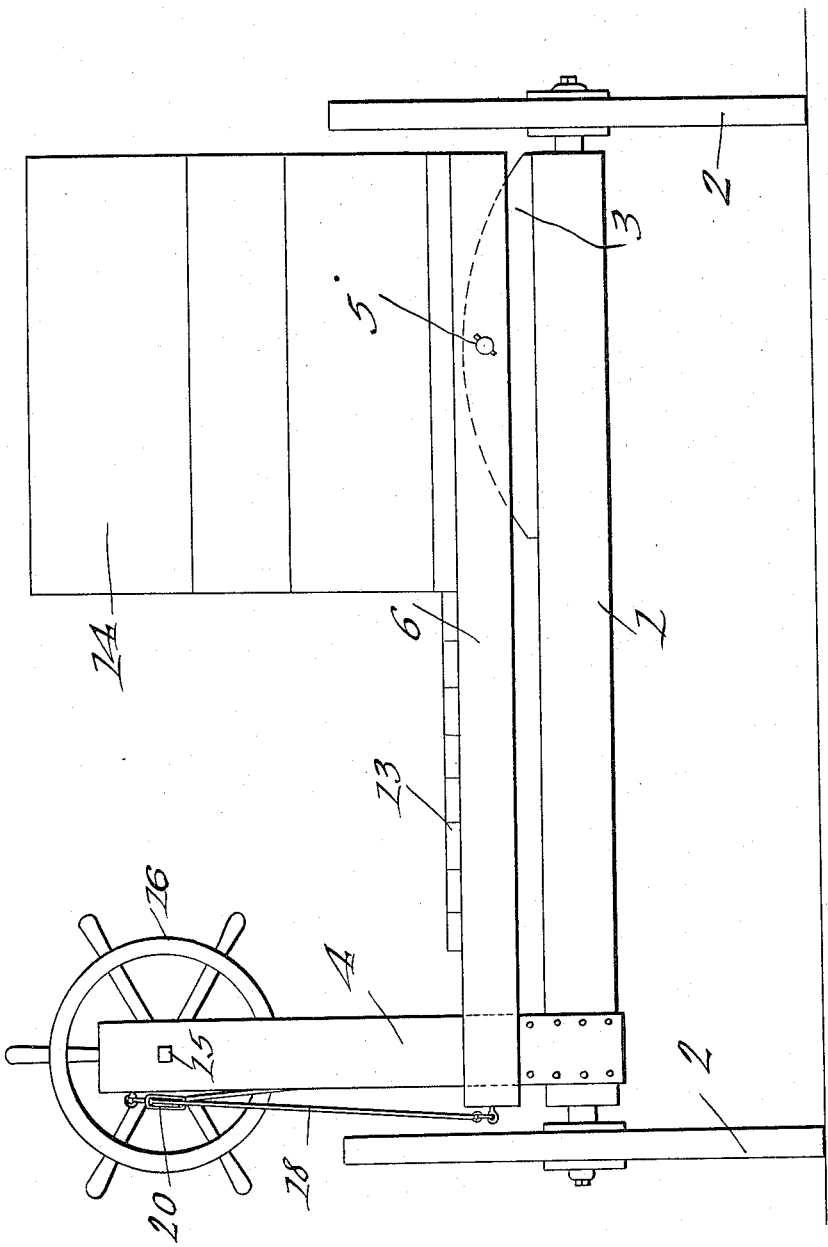

CHARLES F. DEMPSEY, OF VANCOUVER, WASHINGTON.

THRESHING-MACHINE.

1,156,395.  Specification of Letters Patent.  Patented Oct. 12, 1915.

Application filed April 17, 1915. Serial No. 22,163.

*To all whom it may concern:*

Be it known that I, CHARLES F. DEMPSEY, a citizen of the United States, residing at Vancouver, in the county of Clarke and State of Washington, have invented a new and useful Threshing-Machine, of which the following is a specification.

This invention relates to threshing machines and more particularly to means for mounting the same whereby they may be kept level while in motion over uneven or undulating ground, thus making it possible to attach or couple the threshing machine to one side of an ordinary header whereby as the header is moved along a field, and the grain harvested, said grain may be directed onto the threshing machine and separated. It is of course well known that there are machines in use designed both to harvest and separate grain, but such machines are so expensive to operate and are of such a high initial cost that but few farmers can afford to own and maintain them. As a result, it is the general practice for farmers to harvest their grain and leave it standing until the arrival of threshers. As the delay thus occasioned is often considerable, a large amount of waste frequently occurs, mainly due to depreciation of the quality of the grain because of long continued exposure.

One of the objects of the present invention is to provide means whereby an ordinary inexpensive thresher can be coupled to the side of a header and, by providing the threshing machine with leveling means of simple and efficient construction, the two machines can be moved as one structure over a field, the threshing machine being maintained level so that it is thus possible for the ordinary farmer, at slight cost, to both harvest and separate his grain at practically one operation.

A further object is to provide improved means whereby the threshing machine may be maintained level under changing conditions during the movement of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of a threshing machine having the present improvements combined therewith. Fig. 2 is a rear elevation thereof.

Referring to the figures by characters of reference 1 designates the rear bolster of the machine, the same being supported by wheels 2 as ordinarily and being provided at one end with an upwardly extending segment 3, while upon its other end is mounted a standard 4. Projecting through the segment 3 is a pivot pin 5 on which are mounted parallel spaced beams 6 extending to opposite sides of the standard 4. The front bolster 7 of the machine which is connected to the front axle 8 by a king pin 9 in the usual manner, is likewise provided with an upstanding segment 10 similar to the segment 3 and located directly in front thereof, this segment 10 being engaged by a transverse pivot pin 11 extending through spaced parallel cross beams 12. Secured upon the beams 6 and 12 is the platform 13 of the threshing machine, the threshing mechanism being mounted within a housing indicated generally at 14 and close to one side of the platform as shown especially in Fig. 2.

Journaled upon the standard 4 is a shaft 15 adapted to be rotated by a hand wheel 16, this shaft being provided with a windless 17 to which is secured one end of an adjusting cable 18. This cable is looped through a pulley block 19 secured to one of the beams 6 close to the standard 4 and through a pulley block 20 secured to the upper portion of standard 4, the end of the cable being attached to the other beam 6, as shown. A ratchet wheel 21 is secured to shaft 15 and is normally engaged by a pawl 22 whereby retrograde movement of shaft 15 and wheel 16 is prevented.

It is to be understood that a machine such as described is to be coupled to one side of the header, the housing 14 being located at that side of the machine nearest the header. One person is to stand upon the platform 13 where he can readily serve bags to the threshing mechanism. Another person stands upon the platform and operates the wheel 16 for the purpose of quickly raising or lowering the beams 6 relative to the bolster 1 and axle 8. Thus as the machine is moving forward over uneven ground it is possible to maintain the platform 13 substantially horizontal and, as a result, the threshing mechanism can be used continuously during the forward movement of the machine, the grain being supplied directly thereto from the header. Thus it becomes unnecessary, when it is desired to simultaneously harvest and thresh the grain, to utilize the large and expensive combination machines generally employed under these conditions.

What is claimed is:—

A threshing attachment for harvesters, comprising a wheel supported structure having front and rear upstanding alining portions adjacent one side of the structure, a standard adjacent the other side of the structure, a platform, transverse beams pivotally connected, adjacent one end, to the upstanding portions and supporting the platform, certain of said beams straddling the standard, a windlass supported by the standard, pulleys connected to one of the beams and to the upper portion of the standard respectively, a cable secured to the windlass and to another beam and engaging the pulleys at intermediate points, means for rotating the windlass, and means for holding the windlass against retrograde movement under the weight of the platform and its contents.

In testimony that I claim the foregoing as my own, I have hereto affixed my signature in the presence of two witnesses.

CHARLES F. DEMPSEY.

Witnesses:
 EDD. S. LUTER,
 W. E. HUDIN.

Copies of this patent may be obtained for five cents each, by addressing the "Commissioner of Patents, Washington, D. C."